United States Patent
Norling (10) Patent No.: US 10,201,782 B2
(45) Date of Patent: Feb. 12, 2019

(54) EXHAUST GAS SCRUBBER

(71) Applicant: Triton Emission Solutions Inc., San Juan, PR (US)

(72) Inventor: Rasmus Norling, San Juan, PR (US)

(73) Assignee: Triton Emission Solutions Inc., San Juan, PR (US)

(*) Notice: Subject to any disclaimer, the term of this patent is extended or adjusted under 35 U.S.C. 154(b) by 373 days.

(21) Appl. No.: 14/966,515

(22) Filed: Dec. 11, 2015

(65) Prior Publication Data

US 2017/0165609 A1    Jun. 15, 2017

(51) Int. Cl.
| | | |
|---|---|---|
| *B01D 53/79* | (2006.01) | |
| *B01D 53/81* | (2006.01) | |
| *B01D 53/56* | (2006.01) | |
| *B01D 53/50* | (2006.01) | |
| *B01D 53/14* | (2006.01) | |

(52) U.S. Cl.
CPC ......... *B01D 53/79* (2013.01); *B01D 53/1475* (2013.01); *B01D 53/1481* (2013.01); *B01D 53/507* (2013.01); *B01D 53/56* (2013.01); *B01D 53/81* (2013.01); *B01D 2252/1035* (2013.01); *B01D 2257/404* (2013.01); *B01D 2258/012* (2013.01); *Y02C 10/06* (2013.01)

(58) Field of Classification Search
None
See application file for complete search history.

(56) References Cited

U.S. PATENT DOCUMENTS

| | | | | |
|---|---|---|---|---|
| 2014/0248201 A1* | 9/2014 | Hansen | ........... | B01D 47/00 |
| | | | | 423/212 |
| 2015/0147233 A1* | 5/2015 | Toyama | ........... | B01D 53/60 |
| | | | | 422/108 |

FOREIGN PATENT DOCUMENTS

FR    2692645 A1 * 12/1993 ............. C02F 1/485

OTHER PUBLICATIONS

FR2692645 A1 English Translation (Year: 1993).*

* cited by examiner

*Primary Examiner* — Anita Nassiri-Motlagh
(74) *Attorney, Agent, or Firm* — Seed IP Law Group LLP (57) ABSTRACT

According to principles of the embodiments as disclosed herein, an exhaust gas scrubber system with a two-chamber exhaust gas scrubber is provided which allows for scrubbing of exhaust gases without the use of chemicals. In particular, the process fluid used in the system may be seawater. The exhaust gas scrubber includes a first scrubbing chamber having a fluid spraying system, such as an array of atomizing nozzles that spray atomized seawater into the chamber. The atomized seawater aids in reducing the concentration of sulfur oxides in an exhaust gas stream.

8 Claims, 7 Drawing Sheets

EXHAUST GAS SCRUBBER

BACKGROUND

Technical Field

The present disclosure generally relates to systems and methods of removing pollutants from gases and more particularly to an exhaust gas scrubber for removing SOx, NOx, and $CO_2$ from an exhaust gas stream.

Description of the Related Art

Ships are one of the most important modes of freight transportation in the world. Ships, although incredibly environmentally friendly compared to other transportation methods, including trucking and air freight, contribute to environmental pollution, including the introduction of sulfur dioxide ($SO_2$), particulate matter (PM), nitrogen oxide ($NO_x$) and carbon dioxide ($CO_2$). These pollutants contribute to global warming, ozone depletion, ground level ozone formation and acidification. As international commerce expands, so does the environmental impact of increased shipping traffic on the world's oceans.

Exhaust gas scrubbers, in particular those that reduce the emissions of sulfur oxides, including sulfur dioxide, use chemicals, such as lime, sodium hydroxide, and sodium sulfite, among others, to remove sulfur from exhaust gas streams. Using these chemicals comes with its own burdens, including handling, storage, cost, and disposal. In addition, in many cases, the effluent from the process fluids that are used in these scrubbers cannot be disposed of in the ocean due to environmental restrictions on the disposal of such chemicals.

BRIEF SUMMARY

According to principles of the embodiments as disclosed herein, an exhaust gas scrubber system with a two-chamber exhaust gas scrubber is provided which allows for scrubbing of exhaust gases without the use of chemicals such as such as lime, sodium hydroxide, and sodium sulfite, among others. In particular, the process fluid used in the system may be ordinary seawater. The exhaust gas scrubber includes a first scrubbing chamber having a fluid spraying system, such as an array of atomizing nozzles that spray atomized seawater into the chamber. The atomized seawater aids in reducing the concentration of sulfur oxides in an exhaust gas stream.

The exhaust gas scrubber system also includes a demister within the first scrubbing chamber. The demister removes the seawater that was introduced by the sprayer from the exhaust gas stream and aids in preventing the seawater from flowing into an exhaust gas generator, such as a boiler or engine.

One or more frequency coils are connected to the process fluid inlet and outlet. For example, a frequency coil is connected to the inlet of the sprayers. Frequency coils charge and activate the process fluid and increase the process fluid's ability to remove pollutants, such as sulfur oxides, from the exhaust gas stream. A frequency coil may also be placed between a fluid outlet of the scrubber and an inlet to a process fluid heat exchanger to provide additional charge and activation to the process fluid.

The exhaust gas scrubber may include a second scrubbing chamber having a fluid spraying system, such as an array of atomizing nozzles that spray atomized seawater into the chamber. The atomized seawater in the second chamber aids in reducing the concentration of nitrogen oxides in the exhaust gas stream.

One method of removing pollutants from a gas stream using a fluid, such as seawater, includes flowing an exhaust gas stream through a first and a second chamber of a scrubber, the exhaust gas stream including sulfur oxides and nitrogen oxides. The method also includes circulating the first fluid between a first heat exchanger and a first chamber of a scrubber in a first circuit, the first circuit including a hot side of a first heat exchanger, an inlet of the first heat exchanger coupled in fluid communication with a first reservoir of the first chamber, and an outlet of the first heat exchanger coupled in fluid communication with a first sprayer of the first chamber of the scrubber. The method also includes introducing the first fluid into the first scrubbing chamber and reacting the first fluid with at least a portion of the sulfur oxides in the first chamber to remove the portion of the sulfur oxides from the exhaust gas.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes, shapes and relative positions of elements in the drawings are not necessarily drawn to scale and some of these elements are enlarged and positioned to improve drawing legibility. Further, each particular shape and positioning of an element as drawn has been selected for ease of recognition in the drawings and might not be the actual and only shape and position of the particular element. One or more embodiments are described hereinafter with reference to the accompanying drawings.

DETAILED DESCRIPTION

Figure 1:
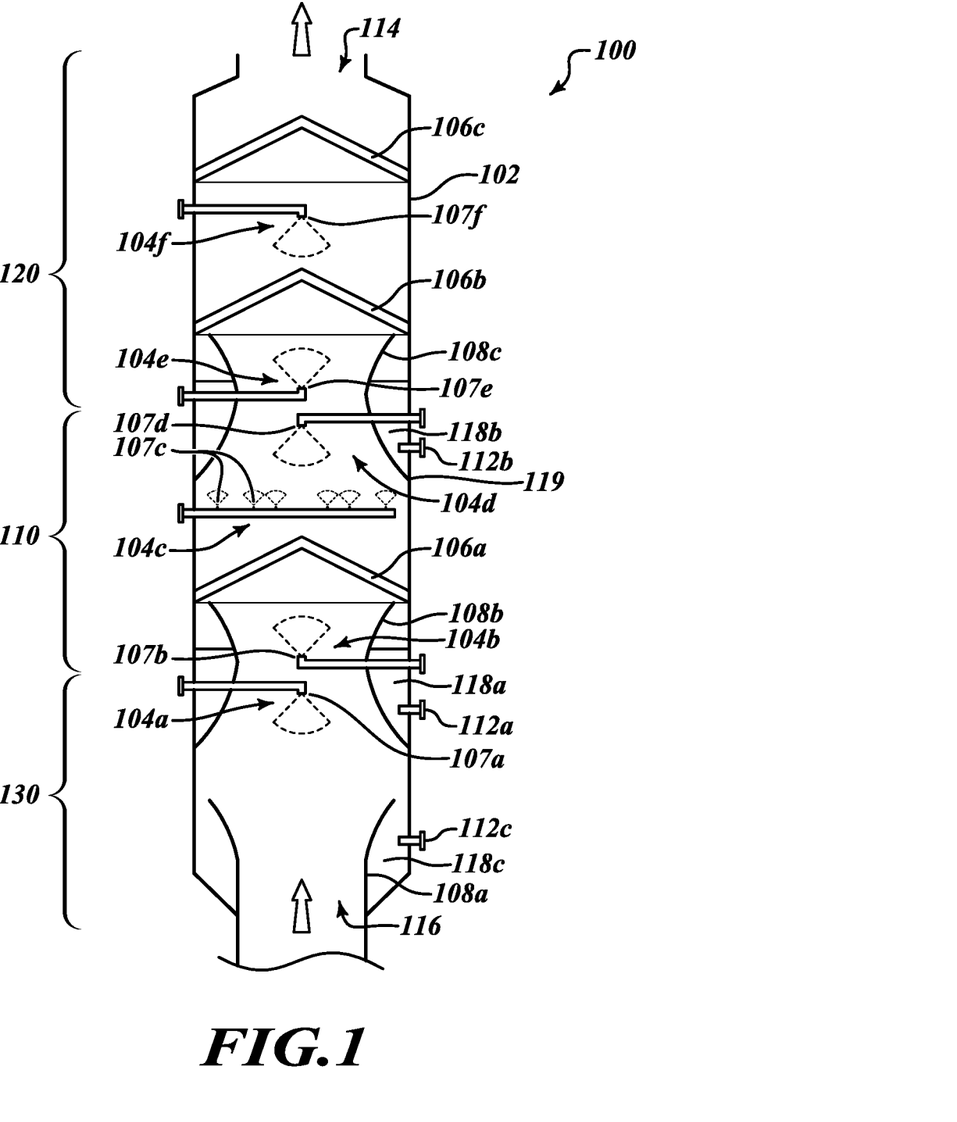
FIG. 1 is a cutaway plan view of a gas scrubber according to one or more embodiments disclosed herein.

FIG. 1 is a cutaway plan view of a gas scrubber 100. The gas scrubber 100 includes a body 102 having an exhaust gas inlet 116 at a first end and an exhaust gas outlet 114 at a second end, opposite the first end. The body 102 of the gas scrubber 100 surrounds a first gas scrubbing section 110, a second gas scrubbing section 120, and an inlet section 130. The gas scrubber 100 can remove sulfur oxides, nitrous oxides, carbon dioxide, and particulate matter.

During operation, flue gas, sometimes also called exhaust gas, enters the body 102 of the gas scrubber 100 through the exhaust gas inlet 116, which may include an inlet cone 108a. The exhaust gas enters the inlet section 130 of the scrubber 100 where a heat recovery process is performed. Exhaust gas from the diesel engine enters at the exhaust gas inlet 116 under very high pressure and is usually extremely hot recovering heat from the exhaust gas cools the gas. As shown in FIG. 1, the process water, such as seawater, is sprayed into the exhaust gas stream through nozzles 107a of sprayer 104a to cool the exhaust gas stream. The process water may be removed from the cooled exhaust gas stream via a demister, not shown in FIG. 1, that is located between the inlet section and the first gas scrubbing section of the gas scrubber 100, or elsewhere.

As explained later herein, there are a series of demisters 106 in the exhaust scrubber 100 which capture the fluid in the vapor, condense it and drain it to the outside. A reservoir 118c is provided is provided to collect water that is removed from the exhaust gas stream or that condenses in the inlet section 130 and a drain 112c is provided to remove the water out of the scrubber 100. The upward draft of the exhaust from the diesel engine is generally enough to carry the misted spray from the nozzles 107a, 107b of the sprayers 104a, 104b up to the demister 106a. However, in the event of a lower velocity exhaust gas entering the inlet 116, or if extra steps are needed to ensure that no misted water will fall into the diesel engine, an additional demister 106 can be positioned right at the inlet just above drain 112c in order to capture fluid and run it into drain 112c for removal of any water that may be in the exhaust gas inlet 116 region.

After passing through the inlet section 130 of the scrubber 100, the exhaust gas then flows through the cone 108b into the first scrubbing chamber 110. The first scrubbing chamber is for removing contaminants such as sulfur oxides, including sulfur dioxide and sulfur trioxide. Process fluid, which could be standard water, seawater, or another fluid, is sprayed into the first scrubbing section via nozzles 107b, 107c, 107d, 107e of sprayers 104b, 104c, 104d, 104e. The process fluid then pulls the contaminants, such as sulfur out, of the exhaust gas.

To remove the sulfur oxides from the exhaust gas stream, the environment within the first scrubbing chamber 110 should be at or below the dew point conditions for the sulfur oxides in the exhaust gas stream so that the sulfur oxides dissolve in the process fluid and react with the water in the process fluid to form sulfur-based acids and sulfate, which exist in nature. The dew point of the sulfur oxides depends, in part, on the temperature and concentration of the sulfur oxides and water within the exhaust gas stream which can be controlled by the scrubber system.

When the process fluid enters the first scrubbing chamber 110 and meets the hot exhaust gases, an evaporative cooling process starts and the temperature of the exhaust gases drops below the sulfur dew point, for example below 40 degrees C., and sulfur begins being washed out by the water as sulfuric acid ($H_2SO_4$). The sulfuric acid lowers the pH in the process fluid to a pH of about 2.8. At this stage, some of the sulfuric acid in the process fluid is converted to $SO_4$.

When the pH of the process fluid has reached 2.8 and the process fluid is fully saturated, the normal chemical absorption of $SO_2$ stops and the scrubbing stops. Since the process fluid is saturated with sulfur it no longer to absorbs $SO_2$ in the water, and a reaction in the exhaust gas scrubber splits the $SO_2$ molecules into free sulfur molecules and $O_2$. The $O_2$ is released back into the exhaust gases and can be measured as an increase in $O_2$ after the scrubber stages. At this stage, the free sulfur molecules can now be attracted to the water droplets entrained in the exhaust gas flow and brought out of the process fluid in the same fashion as any particulate matter does. For example, the process fluid can carry the sulfur until it precipitates out as solids and is removed via a filter.

The demisters 106a, 106b remove the process fluid from the gas stream of the first scrubber section 110, each reservoir 118a, 118b collects the water that is removed from the exhaust gas stream by the respective demisters 106a, 106b and the respective drains 112a, 112b allow the water in the reservoir 118a to leave the scrubber 100.

The exhaust gas then flows from the first scrubber chamber 110 to the second scrubber chamber 120 via the intermediate cone 108c and the demister 106b. An outer perimeter 119 of the intermediate cone 108c is sealed against an inner surface of the body 102 of the scrubber 100, indeed, the outer perimeter of any of the cones 108 is preferably sealed against an inner surface of the body 102. By sealing the outer perimeter 119 of the intermediate cone 108c to the inner surface of the body 102, the exhaust gas flowing through the scrubber 100 flows through the intermediate cone 108c rather than around the intermediate cone 108c. Sealing the intermediate cone 108c also aides in separating the action in the first scrubber chamber 110 from the second scrubber chamber 120.

The cones 108 may be a de Laval type nozzle that facilities expansion of the exhaust gases within the scrubber from a portion with a low cross-sectional area to a portion with a higher cross-sectional area. In some embodiments, for example, an exhaust line 140 may have a cross-sectional area of 4 $m^2$ and the scrubber body 102 may have a cross sectional area of 6 $m^2$. The de Laval type nozzle shaped cone 108a facilitates the expansion of the exhaust gas from the low cross-sectional area exhaust line 140 and the high cross-sectional area scrubber body 102, while minimizing the energy loss associated with such changes in cross-sectional area.

The second scrubber chamber 120 removes additional pollutants from the exhaust gas. For example, nitrogen oxides, such as nitrogen dioxide and nitrogen monoxide, and carbon dioxide can be removed from the exhaust gas stream in the second scrubber chamber 120. Similar to the first chamber 110, the second scrubber chamber 120 includes a demister 106c and a sprayer 104f with a nozzle 107f. Exhaust gas flows into the second scrubber chamber 120 through the intermediate cone 108c. While the exhaust gas flows through the second scrubbing chamber 120, the process fluid from the sprayer 104f interacts with the exhaust gas, removing the pollutants, such as nitrogen oxides and carbon oxides, from the gas in a process similar to the process described above with respect to removing sulfur from the gas stream.

The process fluid is removed from the exhaust gas stream by the demister 106c. Similar to the other demisters, the demister 106c removes moisture from the exhaust gas and collects it, in liquid form, to be reused or discarded. The process fluid that is removed from the exhaust gas stream by the demister 106c is collected in the reservoir 118b and leaves the scrubber though the drain 112c. In some embodiments, the scrubber 100 includes a separate reservoir 118 and drain 112 that collects and drains the process fluid from the second scrubbing chamber 120.

After leaving the second scrubbing chamber 130, the clean exhaust gas flows out of the gas scrubber 100 through the exhaust gas outlet 114 and vents to the air.

Two chambers 110, 120 are used in the process because the low pH of the process water in the first chamber 110 that is caused by the sulfuric acid could cause the $CO_2$ in the process fluid to gas off and actually increase the $CO_2$ in the exhaust gases. Two separate chambers prevents this from happening. The phase change of $CO_2$ can change from solid to gas based on temperature, pH, and pressure and the two chambers 110, 120 allow these conditions to be controlled separately to prevent off gassing in the first chamber 110.

Figure 2A:
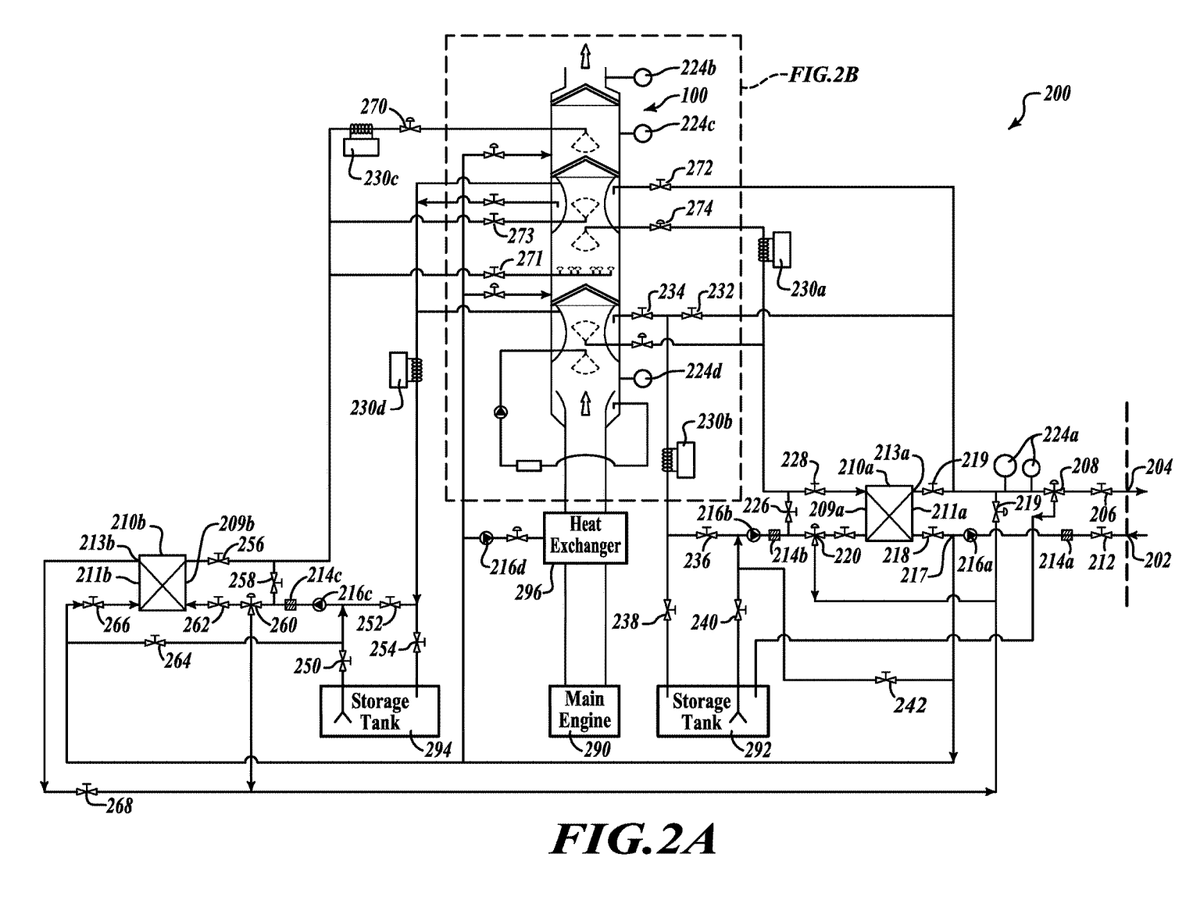
FIGS. 2A and 2B are process diagrams of a scrubber system according to one or more embodiments disclosed herein.
Figure 2B:
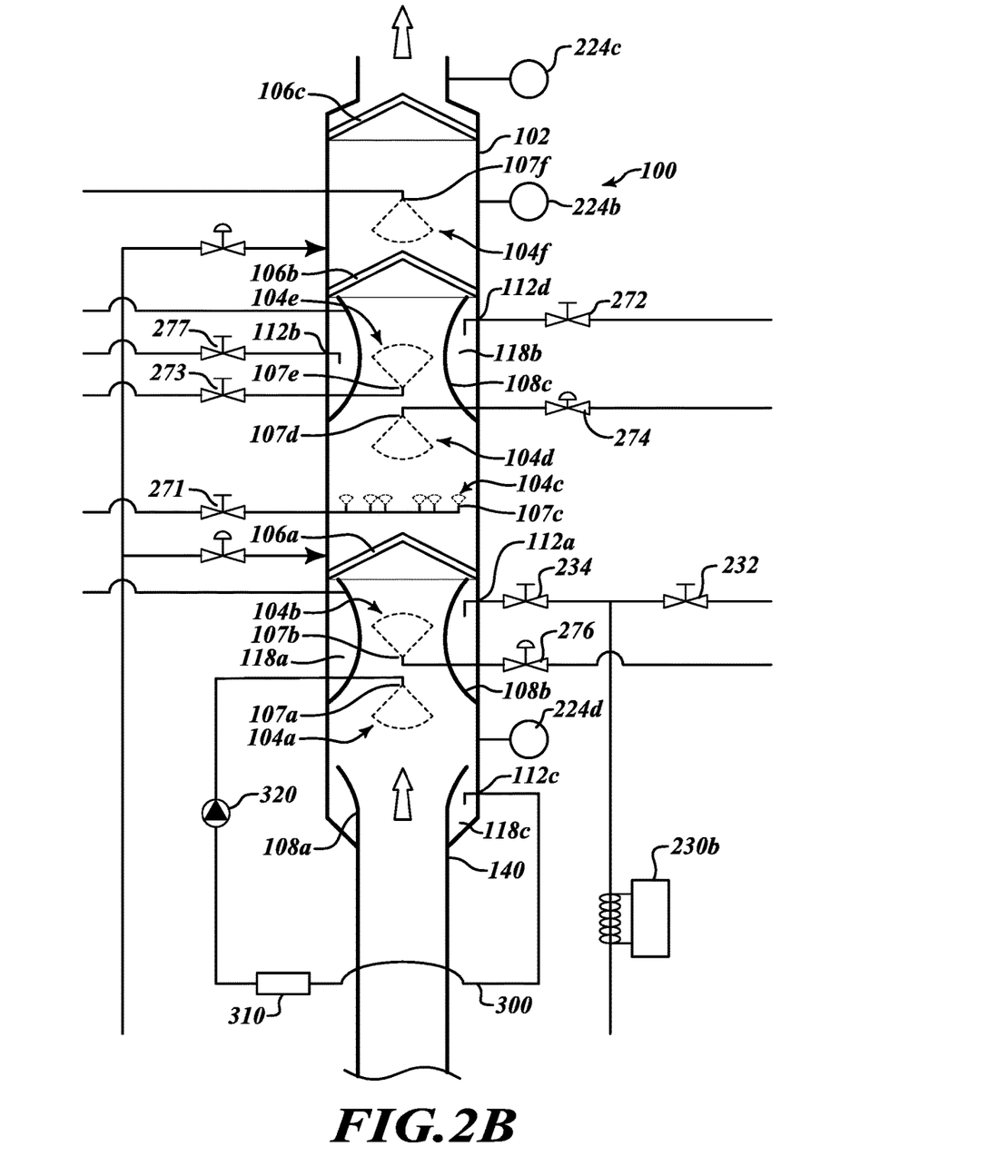

FIGS. 2A and 2B are a process diagram of a scrubber system 200. The main engine 290 burns hydrocarbons, such as diesel fuel, fuel oil, and gasoline. The main engine 290 will usually be an internal combustion engine, but may also be a boiler or other hydrocarbon burning device that emits exhaust gas. The scrubber system 200 includes the scrubber 100 for cleaning the exhaust gas created by a main engine 290. The exhaust gas leaves the main engine 290 and may pass through a heat exchanger 296. The heat exchanger 296, if present, has a number of functions. A first function is to remove some of the heat from the exhaust gas so that it can be used in other places. The exhaust gas exiting from the main engine 296 will be extremely hot, near the combustion temperature of diesel fuel. Accordingly, it contains a great deal of excess heat following the combustion in the engine. Rather than waste all of the heat by venting it to the air, a heat exchanger, such as heat exchanger 296, can extract some of the heat and use it in other locations in the ship. For example, the extracted heat can be used to heat up the diesel fuel prior to burning it. Alternatively, it can be used to heat hot water heaters that occupants of the ship use to shower. It may also be circulated to assist in heating the living chambers of the occupants of the ship. A ship often has need of a heat source, and rather than exhausting the combustion mixture from the diesel engine into the atmosphere, the heat is extracted from the exhaust gas through the heat exchanger 296, and then the hot water can be pumped to other locations on the ship by a pump 216d or stored for other uses on the ship as needed. In one embodiment, heat exchanger 296 is an evaporative cooler of a type well known in the art. In addition, it may also be another type of heat exchanger.

The heat exchanger 296 has another benefit in that, if it is present, it will cool the exhaust gas before the gas enters scrubber 100. There is a preferred temperature at which the sprayed water will mix with the exhaust gas in order to increase, and hopefully maximize, the amount of sulfur that is captured from the exhaust gas and contained in the water spray. If the temperature is too high for the exhaust gas, then the water may not collect the maximum desired amount of sulfur dioxide and the various types of nitrogen oxides. Accordingly, another purpose of the heat exchanger 296 is to cool the exhaust gas before it enters the scrubber so that the exhaust gas is at the preferred temperature in order to maximize, to the extent possible, the amount of pollutants that are removed from the exhaust gas by the water spray. The amount of heat that is removed by the heat exchanger 296 can be customized by having a larger heat exchanger to extract more heat, or a smaller heat exchanger to extract less heat. This may also vary during different times of the main engine operation. When the main engine first begins operating and in the first hour or so of operation, the exhaust gas may not be fully up to temperature and, therefore, the heat exchanger 296 may either be turned off or operating at a low volume. However, once the main engine becomes fully hot, at full running temperature, the exhaust gas will have reached its maximum temperature and, in that instance, it may be preferred to use the heat exchanger 296 to remove a large amount of heat from the exhaust gas before it enters the scrubber 100.

The scrubber system 200 may also include an energy recovery system. The process water may be recirculated though a water and energy recovery system 300, see FIG. 2B. The energy recovery system 300 includes a heat recovery device 310, such as a heat exchanger, that removes recovered energy from the process water used in the scrubber 100. As shown in FIG. 2B, water collected in the reservoir 118c drains out of the scrubber 100 through the drain 112c. The water passes through a heat exchanger 310 where energy is removed from the water and used for other purposes on the ship, for example as explained above with respect to the heat exchanger 269. The water and energy recovery system 300 also includes a pump 320 that adds mechanical energy to the process water within the water and energy recovery system 300 and forces the water through the sprayer 104a and back into the inlet section 130 of the gas scrubber 100.

The scrubber 100 includes the structures and features described above with reference to FIG. 1 which are therefore not repeated here. Additional features are shown in FIGS. 2A and 2B, for example, the scrubber 100 includes various instruments 224 for monitoring and controlling the operation of the exhaust gas scrubber 100. For example, in some embodiments, instrument 224d may be a thermometer, pressure sensor, gas or fluid flow meter, sulfur sensor, nitrogen oxide sensor, carbon oxide sensor, other type of instrumentation, or a combination of one or more of the above types of instrumentation. Similarly, instrumentation 224b, 224c, 224d may be one or more of the types of instrumentation described above.

Fluid enters the scrubbing system 200 through an inlet 202. In some embodiments in which the scrubbing system 200 is on a ship, the fluid will often be seawater. The inlet 202 connects through the hull of a boat and seawater is pulled directly from an ocean or other body of water surrounding the ship for use in this scrubber. The fluid flows through a valve 212 and then through an inlet filter 214a. The fluid is pulled into the system via pump 216a. After flowing through the pump 216a, the fluid may flow to a wye junction 217.

A first outlet of the junction connects the fluid to a first scrubber chamber heat exchanger 210a when a valve 218 is open. The second outlet of the junction 217 connects the fluid to a second scrubber chamber heat exchanger 210b when valve 266 is open. The fluid may then flow through a cold sides 211a, 211b of the scrubber chamber heat exchangers 210a, 210b and out their respective outlets 213a, 213b. From the outlets, the fluid may then flow back out to the ocean through outlet 204. For example, the fluid flowing out of the cold side 211b of the second scrubbing chamber heat exchanger 210b flows through valve 268, and then through valve 219, and then past instruments 224a and through valves 208, 206 to the outlet 204.

Instead of or in addition to flowing through the heat exchangers 210, the fluid may also flow through valves 242, 236, 238 into a first storage tank 292 or through valves 264, 252, 254 into a storage tank 294.

The fluid may also flow from the inlet 202 and into the first and second chambers 110, 120 of the scrubber 100. In order to flow into a first scrubber chamber 110, valve 242 is opened and valves 218, 240, 228, 220 are closed. The fluid flows through valve 242 and then through the pump 216b, the filter 214b, an open valve 226, through a frequency coil 230a, through a valve 274, and into the first chamber 110 of the scrubber 100. Similarly, when valves 250, 252, 256, 260, 262 are closed and a valve 264 is open, the fluid flows through a pump 216c, a filter 214c, a valve 258, through the frequency coil 230c, through valve 270, and into the second scrubber chamber 120 of the scrubber 100. The fluid may also flow into the scrubber 100 through valves 271 and 273.

Some fluid leaves the scrubber 100 through the drain 112a and flows through valve 234. If a valve 232 is closed, then the fluid passes through a frequency coil 230b. If the valve 232 is open, then the fluid can flow out the outlet 204. Similarly, the fluid can leave the scrubber 100 through the drain 112b and flow through a valve 277 before flowing through frequency coil 230d.

The valves may be one or more of many different types, such as manually actuated valves, electrically or pneumatically actuated valves, control valves, and the like. The valves as shown and described herein may be gate valves, ball valves, two-way valves, three-way valves, or of any type suitable for use in an exhaust gas scrubbing system. The valves act to control and direct the flow within the system, for example, to direct seawater from the ocean into the scrubber 100 or the heat exchanger 210a as described above.

The pumps may be one or more of many types of pumps. For example, they may be positive displacement pumps, centrifugal pumps, turbo pumps, reciprocating pumps, or of any type suitable for use in an exhaust gas scrubbing system. The pumps impart energy to the fluid to cause it to flow to and between the various parts of the gas scrubbing system 200.

The filters 214 remove particulate from the fluid. For example, when seawater is pulled into the system it may contain undesirable material such as algae or fluid circulating within the system 200 may accumulate undesirable material such as sulfur. The filters remove the undesirable material from the process fluid. For example, the filter 214a removes undesirable material from the fluid as it enters the scrubbing system 200, while filters 214c, 214b remove accumulated or entrained within the fluid circulating through the gas scrubbing system 200.

In some embodiments, the system 200 can include additional filters 214 at the seawater inlet to prepare the seawater for use in the system 200, and in particular in the scrubber 100. For example, the system 200 may include a first stage filter configured to removed larger microorganisms and debris from the incoming seawater. Such a first stage filter may have a pore size of between 15 microns and 50 microns, such as a 20 micron pore size. The system 200 may also include a second stage filter configured to remove smaller microorganisms and microbes. Such a second stage filter may have a pore size of between 0.5 microns and 10 microns, such as a 5 micron pore size. The system 200 may also include a third stage filter that may be a reverse osmosis system that includes a reverse osmosis membrane.

The heat exchangers 210a, 210b cool the process fluid as it circulates through the system. During closed loop operation, for example as described with reference to FIG. 4 below, fluid circulates into and out of a respective scrubbing chamber 110, 120 of the scrubber 100. During each trip through the scrubber 100, the process fluid picks up thermal energy from the exhaust gas. If the fluid is not cooled, it can increase in temperature until it boils. Boiling in a scrubbing system is undesirable and therefore the fluid flows through a respective hot side 209a, 209b of the heat exchangers 210a, 210b where the energy in the circulating process fluid is transferred though a heat exchange process to the respective cold sides 211a, 211b of the heat exchangers 210a, 210b and into cooling fluid, which carries the thermal energy out of the system, for example, through outlet 204.

In some embodiments, the pumps 216, filters 214, and heat exchangers 210a, 210b are placed at a location with lower potential energy than the scrubber, for example, at a location within a ship that is below the scrubber 100. This allows the water leaving the scrubber 100 to naturally flow down to an inlet of the pumps 216 and reduces the energy consumption of the pumps 216.

The frequency coils 230 energize the process water by subjecting the process water to an electrical voltage signal with a frequency that varies between 1,000 Hz and 100,000 Hz. Water is a polar molecule, having a positive charged end and a negatively charged end. Due to this polarity, each water molecule within the process water exhibits an attraction and alignment to surrounding water molecules. This attraction and alignment can interfere with the scrubbing process. By passing the water through a voltage frequency coil that has a varying electrical field on the inside of the coil, such as frequency coils 230, the attraction and alignment of the water molecules is temporarily disrupted by the field inside the coil loop and the water more easily pulls contaminants from the exhaust gas.

Figure 3:
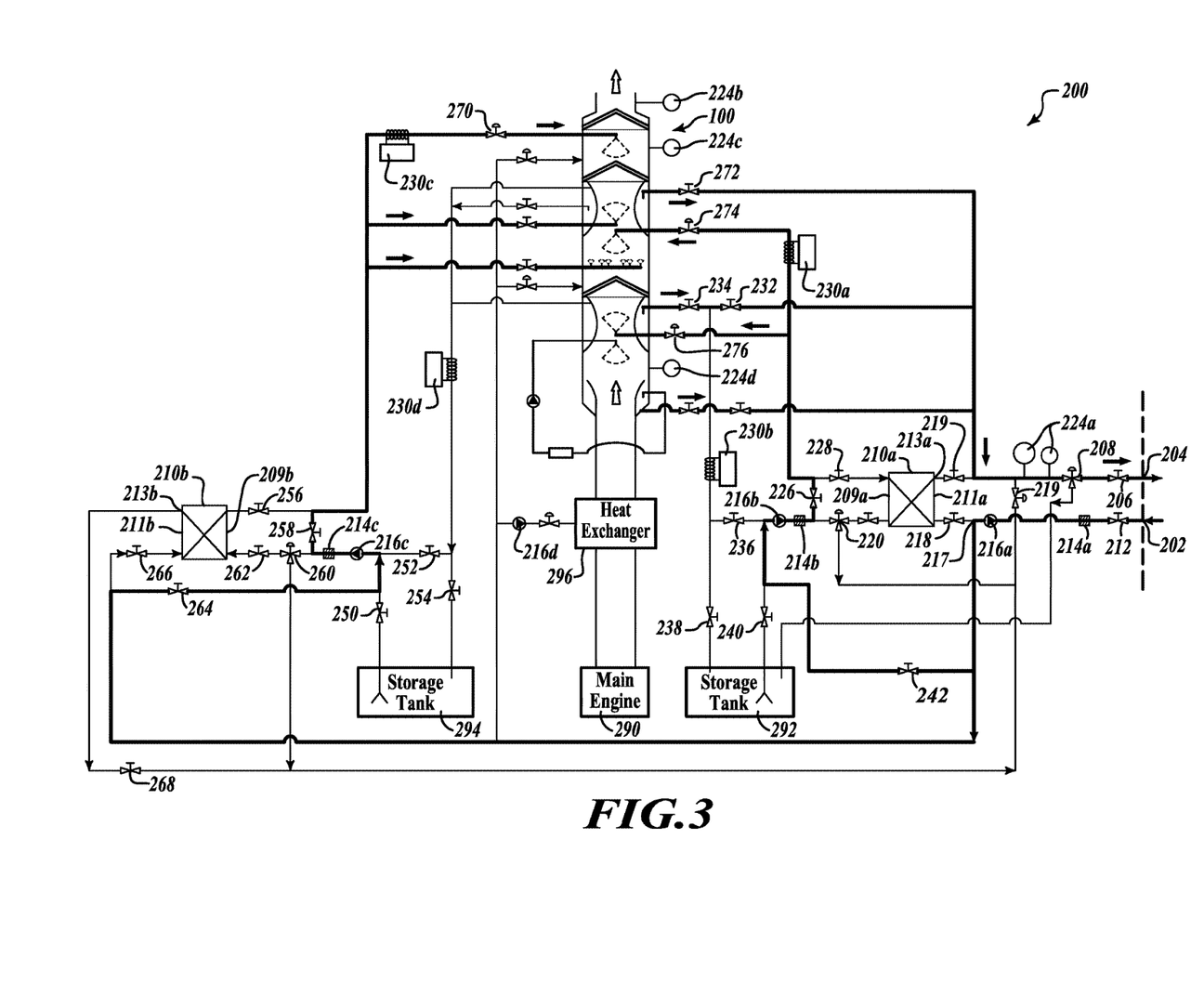
FIG. 3 is process diagram of a scrubber system according to one or more embodiments disclosed herein.
Figure 4:
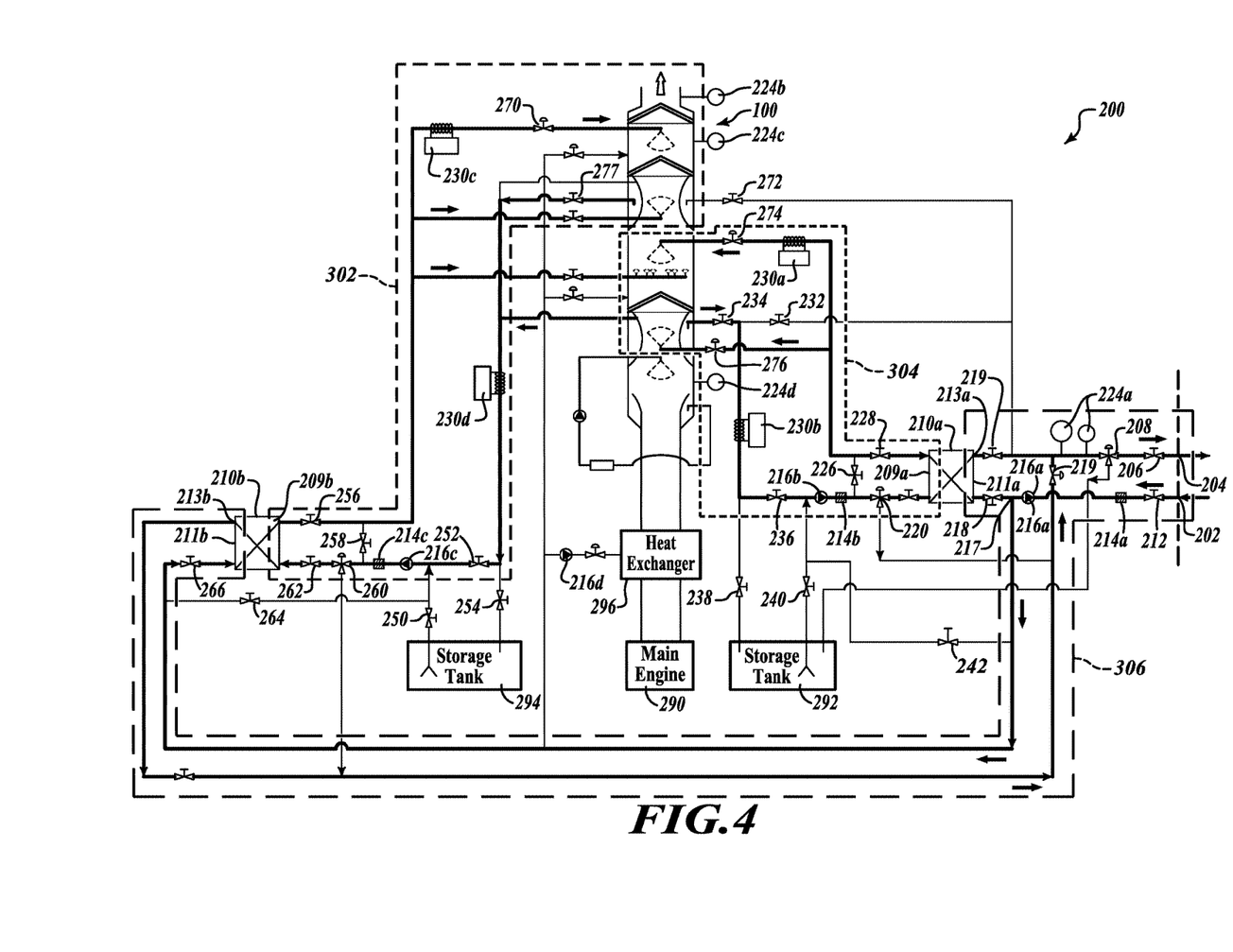
FIG. 4 is process diagram of a scrubber system according to one or more embodiments disclosed herein.

The gas scrubbing system 200 can operate in two different configurations: an open loop configuration, shown in FIG. 3, and a closed loop configuration, shown in FIG. 4. In the open loop configuration, process fluid is pulled in into the system 200 through inlet 202 and flows into a respective gas scrubbing chamber through the sprayers 104 to pull contaminants out of the exhaust gas. The process fluid is collected at the bottom of each of the respective gas scrubbing chambers 110, 120 where it exits the respective gas scrubbing chamber 110, 120 through one or more outlets 112 and flows out the gas scrubbing system 200 through outlet 204. This process is explained in great detail, below.

FIG. 3 shows a process diagram of the scrubber system 200 during open loop operation. The open loop process uses the natural buffer and neutralization properties of seawater to pull the contaminants out of the exhaust gas. Due to the seawater's natural alkalinity, it has the ability to neutralize the $SO_2$ in the exhaust gases in the first scrubbing chamber 110. The seawater also removes NOx and $CO_2$ from the exhaust gases in the second scrubbing chamber 120.

The process starts by pumping seawater into the system 200 using a pump 216a, which is referred to as a seawater cooling pump. The seawater flows into the inlet 202, through the inlet valve 212 to the inlet filter 214a, and then through the inlet pump 216a. The cold side inlet valve 218 of the heat exchanger 210a and the cold side inlet valve 266 to heat exchanger 210b, are closed, thus, the seawater is diverted down and through valves 242, 264.

The seawater flowing through valve 242 eventually reaches the first scrubbing chamber 110 by first flowing through a first chamber circulating pump 216b, a first chamber filter 214b, and a valve 226. Valves 240, 236, 220, 228 are all closed to aid in directing the seawater into the first scrubbing chamber 110.

After flowing through the valve 226, some of the seawater is charged and activated by the frequency coil 230a before flowing through a valve 274 and entering the first scrubbing chamber 110 where the seawater is expelled through nozzles 107d in the sprayer 104d. Some of the seawater flows directly into the first scrubbing chamber 110 via valve 276 and the sprayer 104b. The sprayers 104 and associated nozzles 107 atomize the seawater as it enters the exhaust gas stream flowing through the first scrubbing chamber 110 of the scrubber 100 where the seawater removes the sulfur oxides from the exhaust gas stream. As used herein, atomize means to convert a fluid into very fine particles or droplets The seawater, now containing the sulfur that was removed from the exhaust gas, is removed from the exhaust gas stream by one or more demisters 106 and collected in the reservoirs 118. The seawater leaves the exhaust gas scrubber 100 through the drains 112, for example the drain 112a, flows through valves 234, 232, then through valves 208, 206, and back into the sea through the outlet 204.

The seawater reaches the second scrubbing chamber 120 by flowing through valve 264 and then through the second chamber circulating pump 216c, the second chamber filter 214c, and the open valve 258. Valves 266, 260, 250, 252, 256 are all closed to aid in directing the seawater into the second scrubbing chamber 120.

After flowing through the valve 258, some of the seawater is charged and activated by the frequency coil 230c before flowing through valve 270 and entering the second scrubbing chamber 120, where the seawater is expelled through nozzles 107f in the sprayer 104f. Some of the seawater also enters the second chamber 120 through the sprayer 104e. The nozzles 107e, 107f atomize the seawater as it enters the exhaust gas stream flowing through the second scrubbing chamber 120 of the scrubber 100 where the seawater removes the undesirable material from the exhaust gas stream. The undesirable material may be additional sulfur oxides or other pollutants such as nitrogen oxides and carbon dioxide.

The seawater, now containing the nitrogen and carbon that was removed from the exhaust gas, is removed from the exhaust gas stream by one or more demisters 106b, 106c and collected in a reservoir 118c. The seawater leaves the exhaust gas scrubber 100 through a drain 112b, flows through valve 272, then through valves 208, 206, and back into the sea through the outlet 204.

Before the seawater flows back into the sea through an outlet 204, the seawater passes through a wash water monitoring system that includes instrumentation 224a that tests various aspects of the seawater, for example turbidity, pH, and polycyclic aromatic hydrocarbons. If the wash water monitoring system indicates that the wash water is above or below limits for discharge of water into the sea, the 3-way valve 208 switches over and the water is routed to the storage tank 292 for further processing.

FIG. 4 is process diagram of the scrubber system 200 during closed loop operation. During closed loop operation, there are three separate water circuits: a cooling water circuit 306, a first scrubbing circuit 304, and a second scrubbing circuit 302. The cooling water circuit 306, is isolated from the first scrubbing circuit 304 and the second scrubbing circuit 302. The first scrubbing circuit 304 and the second scrubbing circuit 302 can also be isolated from each other.

The cooling water circuit 306 circulates seawater out of the sea through the cold sides 211a, 211b of each of the heat exchangers 210a, 210b and then back into the sea. The seawater is pulled into the cooling water circuit 306 through inlet 202 by the cooling water pump 216a. The seawater flows through filter 214a, then through the pump 216a, and at junction 217, the seawater flow splits. A first portion of the seawater flows through the cold side 211a of the heat exchanger 210a and back out into the sea through the outlet 204. A second portion of the seawater flows through the cold side 211b of the heat exchanger 210b before flowing back out to the sea through the outlet 204.

The first scrubbing chamber 304 circulates process fluid, which may be distilled water, or some other fluid, between the hot side 209a of the first heat exchanger 210a and the interior of the first scrubbing chamber 110. The process fluid is cooled within the heat exchanger 210a through a heat exchange process wherein the thermal energy in the process fluid is transferred to the seawater in the cooling water circuit 306. After being cooled, the process fluid flows through pipes to the frequency coil 230a, where the process fluid is charged and activated before flowing into the first scrubbing chamber 110 of the exhaust gas scrubber 100, or directly into the scrubber 100, without flowing through a frequency coil 230. In the scrubber 100, the process fluid absorbs heat from the exhaust gas and scrubs the exhaust gas of sulfur compounds, as described above with reference to FIG. 1.

When the process fluid has absorbed the heat and sulfur from the exhaust gas within the scrubber 100, the demister 106a, which may be an angular vein demister, removes a process fluid from the gas stream and directs the process fluid to the bottom reservoir 118a and out the drain 112a.

After leaving the drain 112a, the process fluid flows through another frequency coil 230b where it is energized again before flowing through the pump 216b, which imparts mechanical energy to the process fluid and causes the circulation of the fluid through the first scrubbing chamber 304. The process fluid then flows through the first scrubbing chamber filter 214b where solids are removed from the process fluid. The process fluid then exits the filter 214b and enters the hot side 209a of the first heat exchanger 210a and the process is repeated.

A benefit of the closed loop system of FIG. 4 is that a separate fluid from seawater can be used for the process fluid. If only seawater is used, the exhaust system will slowly collect salt and might become clogged. By using locally obtained seawater for the heat exchange and cooling, then returning it to the ocean, the weight of carrying a large water supply is saved. Then, by using a cleaner water such as pure water of distilled water that is recirculated in a closed loop, the system is kept clean.

The second scrubbing chamber 302 circulates process fluid, which may be seawater, between the hot side 209b of the second heat exchanger 210b and the interior of the second scrubbing chamber 120. The process fluid is cooled within the heat exchanger 210b through a heat exchange process wherein the thermal energy in the process fluid is transferred to the process fluid in the cooling water circuit 306. After being cooled the process fluid flows through pipes to the frequency coil 230c, where the process fluid is charged and activated before flowing into the second scrubbing chamber 120 of the exhaust gas scrubber 100.

The process fluid is then expelled and atomized into the interior of the scrubber 100 by the nozzles 107e, 107f of the sprayers 104e, 104f. When the excited process fluid enters the second scrubbing chamber 120 and meets the hot exhaust gases, an evaporation cooling process starts and the nitrogen oxide and carbon dioxide is washed out of the exhaust gas stream by the process fluid.

When the process fluid has absorbed the heat, nitrogen oxides, and carbon dioxide from the exhaust gas, the demister 106c, which may be an angular vein demister, removes the process fluid from the gas stream and directs the process fluid to the bottom reservoir 118b and out the drain 112b.

After leaving the drain 112b and flowing through the valve 277, the process fluid flows through another frequency coil 230d where it is energized again before flowing through the pump 216b, which imparts mechanical energy to the process fluid and causes the circulation of the fluid through the first scrubbing chamber 302. The process fluid then flows through the second scrubbing chamber filter 214c where solids are removed from the process fluid. The process fluid then exits the filter 214c and enters the hot side 209b of the second heat exchanger 210b and the process is repeated.

Figures 5A, 5B, 5C:
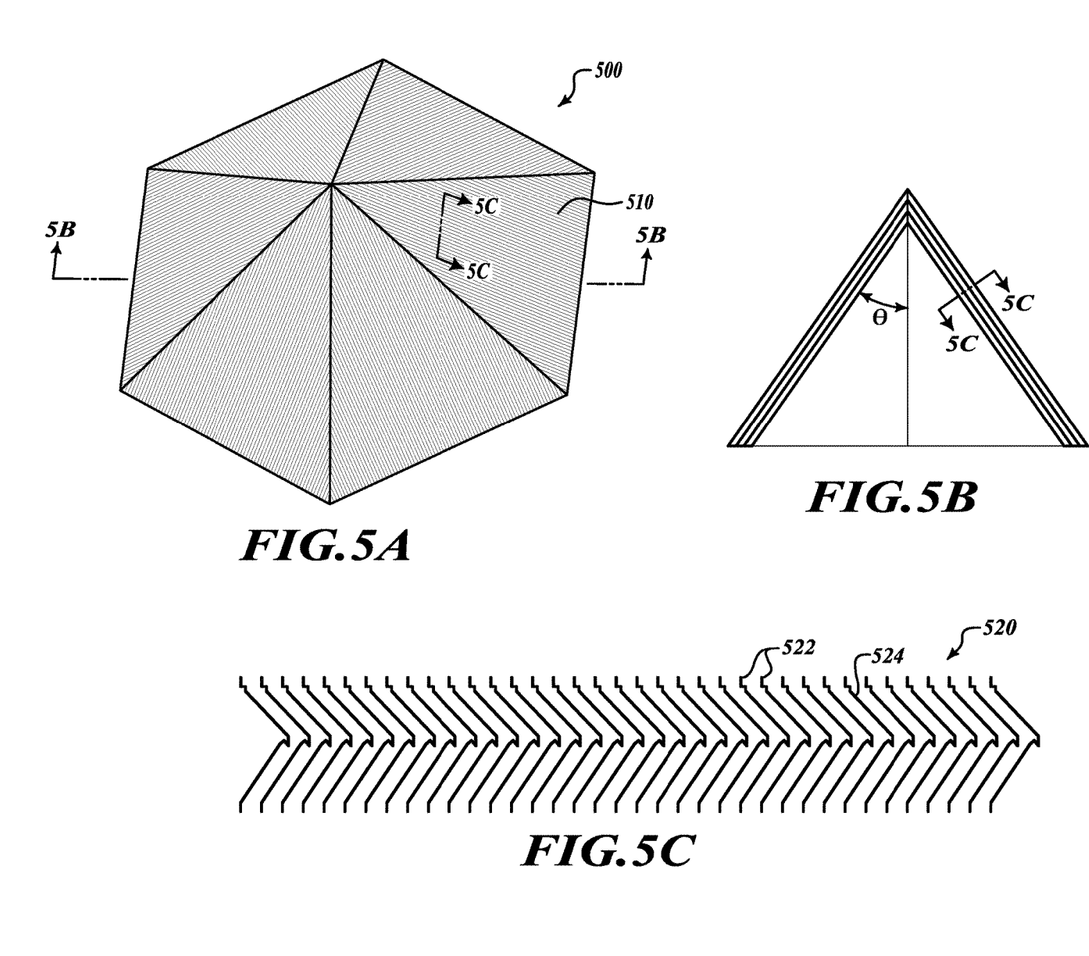
FIG. 5A is an isometric view of a demister according to one or more embodiments disclosed herein.
FIG. 5B is a cross-sectional view of the demister of FIG. 5A along 5B-5B.
FIG. 5C is a cross-sectional view of the demister of FIG. 5A along 5C-5C.

FIGS. 5A-5C show an embodiment of a demister 500, which may be similar to the demisters 106, discussed earlier. The demister 500 has a hexagonal pyramid shape. Each section 510 of the hexagon is a triangular vane pack 520. In some embodiments, the demister 500 has pentagonal pyramid shape or other pyramidal shape. The cross-section 5B-5B shown in FIG. 5B shows that each section 510 is arranged at an angle θ of approximately 55 degrees with the direction of exhaust gas flow through the scrubber. This arrangement increases the surface area of, and reduces the pressure drop across, the demister 500 as compared to a demister that has vane packs that are perpendicular to the exhaust gas flow within a scrubber. For example, if the cross sectional area of the scrubber 100 is 6 m², the surface area of a demister having angled sections may be 12 m².

FIG. 5C shows a cross section of a vane pack 520 and shows the arrangement and shape of individual vanes 522. The vanes 522 are shaped to provide a tortuous path through which the exhaust gas and the water entrained within the exhaust gas pass through. The tortuous path causes the water entrained within the exhaust gas to impact on and adhere to a surface 524 of the vanes 522, thereby removing the water from the exhaust gas. Demisters that remove water vapor from the air are generally known in the art. Any of the many well-known demisters in the art can be used.

Figure 6A:
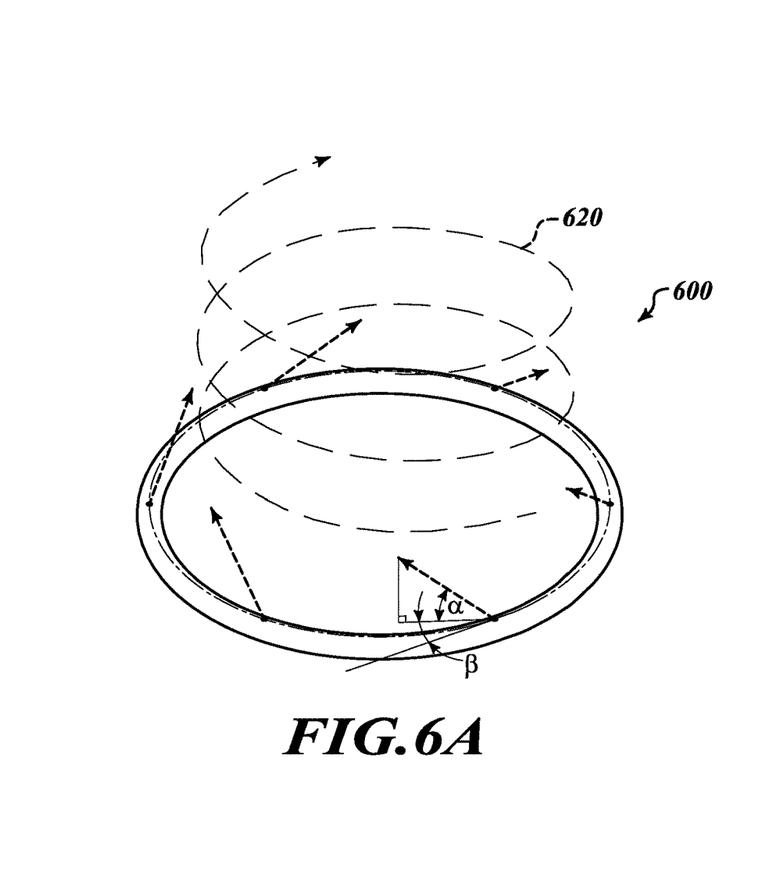
FIG. 6A is an isometric view of a sprayer according to one or more embodiments disclosed herein.
Figure 6B:
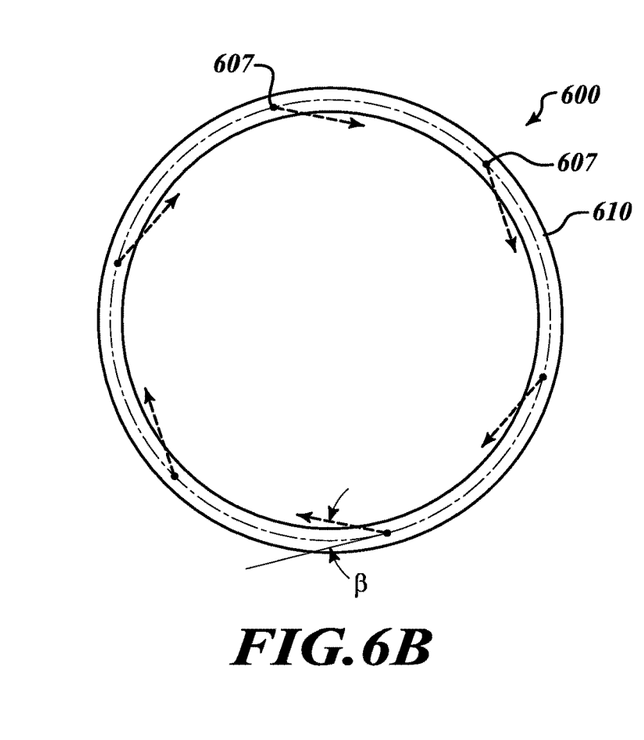
FIG. 6B is a top view of the sprayer of FIG. 6A according to one or more embodiments disclosed herein.

FIGS. 6A and 6B show an embodiment of a sprayer 600 that may be similar to sprayer 104c, discussed earlier. The sprayer 600 includes a plurality of nozzles 607 arranged around a circular manifold 610. The nozzles 607 are positioned and directed such that the water expelled from the sprayer induces a vortex motion 620 upon the exhaust gas that flows by the sprayer 600. The nozzles are directed at an inclination angle α and a tangent angle β. The inclination angle α is an angle formed between a plane that is perpendicular to the flow of the exhaust gas in a scrubber 100 and the direction of the nozzle 607. The tangent angle β is an angle formed between a tangent to the manifold 600 at the nozzle's location and the direction of the nozzle 607. In one embodiment, the tangent angle and inclination angle are each 45 degrees.

The various embodiments described above can be combined to provide further embodiments. Aspects of the embodiments can be modified, if necessary to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A gas scrubbing system comprising:
a gas scrubber;
a combustion gas source;
a gas inlet coupling the gas scrubber in fluid communication with the combustion gas source;
a gas outlet coupling the gas scrubber in fluid communication with an external environment;
a first scrubbing chamber within the gas scrubber being configured to remove SOx from a combustion gas stream, the first scrubbing chamber including a first cavity and a first sprayer configured to spray a first fluid into the first cavity;
a first fluid inlet nozzle within the first scrubbing chamber in fluid communication with a first water source and configured to output water from the first water source into the first scrubbing chamber;
a first fluid pipe configured for water to pass there through from the first water source to the first fluid inlet nozzle;
a first frequency coil positioned around the first fluid pipe at a location prior to the first fluid inlet nozzle, the first fluid pipe passing through the inside of the first frequency coil while it has an AC voltage of a first selected frequency passing through the first frequency coil to create an electric field inside the first frequency coil prior to the first fluid inlet nozzle to subject the water to the electric field as it passes through the first fluid pipe within the first frequency coil to charge the water;
a first demister positioned in the first scrubber chamber, the first demister configured to remove the first fluid from the first cavity of the first scrubbing chamber; and
a first fluid collection reservoir at a bottom of the first scrubbing chamber and being configured to capture and store the first fluid removed from the first cavity by the first demister, wherein the gas inlet is an inlet cone and couples the first scrubbing chamber in fluid communication with the combustion gas source, the first demister being between the first sprayer and the inlet cone and configured to aid in preventing the first fluid from entering the inlet cone and the combustion gas source.

2. The gas scrubbing system of claim 1 further comprising:
a filter coupled to the first fluid inlet nozzle and configured to remove sulfur from the first fluid.

3. The gas scrubbing system of claim 1 wherein the first water source is seawater.

4. The gas scrubbing system of claim 1 further comprising:
a second scrubbing chamber within the gas scrubber being coupled in fluid communication with the first scrubbing chamber and being configured to remove CO₂ from the combustion gas stream;
a second fluid inlet coupling the second scrubbing chamber in fluid communication with a second water source; and
a second frequency coil at the second fluid inlet, the second frequency coil being configured to charge the first fluid, wherein the first water source and the second water source are the same.

5. The gas scrubber of claim 1 further comprising:
a second scrubbing chamber;
an intermediate cone coupling the first scrubbing chamber and the second scrubbing chamber in fluid communication;
a second demister being between the second sprayer and the intermediate cone and configured to aid in preventing the second fluid from entering the intermediate cone and the first scrubbing chamber.

6. The gas scrubber of claim 5 further comprising:
a third demister being between the first sprayer and the gas outlet and configured to aid in preventing the first and second fluids from flowing out the gas outlet.

7. The gas scrubber of claim 5 further comprising:
a second fluid inlet nozzle within the first scrubbing chamber in fluid communication with a second water source and configured to output water from the second water source into the first scrubbing chamber;
a second fluid pipe configured for water to pass there through from the second water source to the second fluid inlet nozzle; and
a second frequency coil positioned around the second fluid pipe at a location prior to the second fluid inlet nozzle, the second fluid pipe passing through the inside of the second frequency coil while it has an AC voltage of a second selected frequency passing through the second frequency coil to create an electric field inside the second frequency coil prior to the second fluid inlet nozzle to subject the water to the electric field as it passes through the second fluid pipe within the second frequency coil to charge the second fluid.

8. The gas scrubber of claim 1 wherein the first selected frequency is between 1 K hertz and 100 K hertz.

* * * * *